US008606608B2

(12) United States Patent
Bottou et al.

(10) Patent No.: US 8,606,608 B2
(45) Date of Patent: Dec. 10, 2013

(54) OFFLINE COUNTERFACTUAL ANALYSIS (75) Inventors: Leon Bottou, Kirkland, WA (US); Denis Charles, Bellevue, WA (US); David Maxwell Chickering, Bellevue, WA (US); Patrice Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 12/972,417

(22) Filed: Dec. 17, 2010

(65) Prior Publication Data
US 2012/0158488 A1    Jun. 21, 2012

(51) Int. Cl.
*G06Q 10/00* (2012.01)

(52) U.S. Cl.
USPC ........................................... 705/7.11

(58) Field of Classification Search
USPC .............................. 705/7.38, 7.11
See application file for complete search history.

(56) References Cited

U.S. PATENT DOCUMENTS

| | | | |
|---|---|---|---|
| 6,665,653 B1 * | 12/2003 | Heckerman et al. ............ | 706/47 |
| 7,562,064 B1 | 7/2009 | Chickering et al. | |
| 7,756,769 B2 * | 7/2010 | Haig ............................. | 705/36 R |
| 2003/0040850 A1 | 2/2003 | Najmi et al. | |
| 2009/0265304 A1 * | 10/2009 | Ait-Mokhtar et al. ............ | 707/2 |
| 2009/0300672 A1 | 12/2009 | Van Gulik | |
| 2010/0094673 A1 | 4/2010 | Lobo et al. | |

OTHER PUBLICATIONS

Feldman, et al., "Online Stochastic Packing applied to Display Ad Allocation", Retrieved at <<http://arxiv.org/PS_cache/arxiv/pdf/1001/1001.5076v2.pdf>>, Feb. 17, 2010, pp. 1-19.
Feuerstein, et al., "New Stochastic Algorithms for Placing Ads in Sponsored Search", Retrieved at <<http://www-2.dc.uba.ar/profesores/feuerstein/LAWEB2007.pdf>>, Proceedings of the 5th Latin American Web Congress LA-WEB, May 8-12, 2007, pp. 9.
Devanur, et al., "The Adwords Problem: Online Keyword Matching with Budgeted Bidders under Random Permutations", Retrieved at <<http://research.microsoft.com/en-us/um/people/nikdev/pubs/Adwords.pdf >>, ACM Conference on Electronic Commerce, Jul. 6-10, 2009, pp. 8.
Levin, et al., "Dynamic Pricing with Online Learning and Strategic Consumers", Retrieved at <<http://citeseerx.ist.psu.edu/viewdoc/download?doi=10.1.1.110.7091&rep=rep1&type=pdf >>, Forthcoming in Operations Research, 2007, pp. 43.

* cited by examiner

Primary Examiner — Romain Jeanty (57) ABSTRACT

Counterfactual analysis can be performed "offline", or "after the fact", based on data collected during a trial in which random variations are applied to the output of the system whose parameters are to be the subject of the counterfactual analysis. A weighting factor can be derived and applied to data collected during the trial to emphasize that data obtained when the random variations most closely resembled the output that would be expected if counterfactual parameters were utilized to generate the output. If the counterfactual parameters being considered differ too much from the parameters under which the trial was conducted, the offline counterfactual analysis can estimate a direction and magnitude of the change of the system performance, as opposed to deriving a specific expected system performance value. In economic transactions, the random variations can be considered variations in the price paid by another party, thereby enabling derivation of their marginal cost.

20 Claims, 4 Drawing Sheets

OFFLINE COUNTERFACTUAL ANALYSIS

BACKGROUND

Often, it can be desirable to know how the results produced by a particular system would have changed if that system had been developed using a different set of parameters. For example, a developer of a computer application program that enables a computing device to play chess may wish to know whether a particular strategy would have resulted in the computing device playing a better game of chess than the strategy that was actually implemented. Questions directed to how a particular result would have been different had a different set of circumstances existed are known as "counterfactual" considerations.

Within the context of the development of computer-executable instructions directed to one or more tasks, counterfactual considerations are typically evaluated by modifying the computer-executable instructions to account for a different set of circumstances, or to be based on a different set of parameters, and then observing the result of the execution of such modified computer-executable instructions. When developing computer-executable instructions that are directed to the performance of tasks guided by a particular user, such a mechanism for evaluating counterfactual considerations can be practical, as many different variants of computer-executable instructions can be generated in parallel and tested in parallel.

However, for computer-executable instructions directed to the performance of tasks involving a large group of individuals, such as the computer-executable instructions that provide services to many thousands of users via networks of interconnected computing devices, counterfactual considerations can be difficult to evaluate. For example, it can be difficult to properly simulate the behavior of large groups of human users, such as would traditionally make use of such computer-executable instructions. Similarly, exposing large groups of human users to different alternatives of computer-executable instructions, designed to evaluate one or more counterfactual considerations, risks alienating such human users due to, for example, possible sub optimal performance by one or more of those alternative computer-executable instructions.

One context within which counterfactual considerations often arise is in the selection, and display, of advertisements through networks of interconnected computing devices. Traditionally, the selection of advertisements that are to be displayed to users communicating with a service being provided via networks of interconnected computing devices, are based on models that seek to predict how useful the displayed advertisements are going to be to the particular users to which they are being displayed and, as a result, possibly causing the users to select such advertisements, thereby generating revenue for the entity displaying the advertisements. Since the behavior of such a large and diverse pool of users can be difficult to accurately model, traditional mechanisms for evaluating alternative approaches to the selection of advertisements to be displayed to particular users rely on testing such mechanisms on a small sample of actual users. However, as will be recognized by those skilled in the art, such traditional mechanisms are inefficient, both in that they can require substantial setup effort, and in that they can require an extended duration to collect sufficient results, which can, themselves, be too varied to derive meaningful data from. Additionally, such traditional mechanisms can limit the amount of counterfactual considerations that can be tested due simply to a limit on the amount of users, and visits, via which to test such counterfactual considerations.

SUMMARY

In one embodiment, counterfactual analysis can be performed "offline", or "after the fact", based on data collected during a trial in which random variations are applied to the output of the system whose parameters are to be the subject of the counterfactual analysis. The random variations can result in the output of the system having a probability distribution around its traditional value, given the parameters currently being utilized by the system. The offline counterfactual analysis can derive an expected system performance that would have resulted if the system had utilized counterfactual parameters instead of the parameters under which the trial was conducted.

In another embodiment, an offline counterfactual analysis can be performed by deriving a weighting factor and applying it to the data collected during a trial, in which random variations were applied to the output of a system in order to estimate the behavior and performance of that system when utilizing different parameters. The weighting factor can increase the importance of the data that was collected while the output of the system was similar to that expected given the parameters being contemplated by the offline counterfactual analysis, while decreasing the importance of other data. The weighting factor can be based on a ratio of the predicted probability distribution of the output of the system, with the parameters under which the trial was conducted, as that predicted probability distribution would be predicted using the counterfactual parameters; to the probability distribution of the output of the system with the parameters under which the trial was conducted.

In a further embodiment, if the counterfactual parameters being considered by the offline counterfactual analysis differ too much from the parameters under which the trial was conducted, the offline counterfactual analysis can estimate a direction and magnitude of the change of the system performance, as opposed to deriving a specific expected system performance. In such an embodiment, a vector indicating the direction in which the system performance would change, and how quickly that change would occur, can be generated based on the system performance during the trial multiplied by a derivative of the logarithm of the probability distribution of the output of the system, with the parameters under which the trial was conducted with respect to changes in the model under which the trial was conducted.

In a still further embodiment, if the system influences economic decisions by other actors, the randomizations applied can be considered to be economic randomizations and the marginal cost of the other actors can be derived, assuming that such other actors are rational economic actors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to mechanisms for performing counterfactual analysis "offline", or "after the fact", based on data collected during a trial in which random variations are applied to the output of the system whose parameters are to be the subject of the counterfactual analysis. Offline counterfactual analysis can be performed by deriving a weighting factor and applying it to the data collected during the trial. The weighting factor can increase the importance of the data that was collected while the output of the system was similar to that expected given counterfactual parameters, while decreasing the importance of other data. If the counterfactual parameters being considered differ too much from the parameters under which the trial was conducted, the offline counterfactual analysis can estimate a direction and magnitude of the change of the system performance, as opposed to deriving a specific expected system performance. Additionally, if the system being analyzed influences economic decisions by other actors, the randomizations applied can be considered to be economic randomizations and the marginal cost of the other actors can be derived, assuming that such other actors are rational economic actors.

For purposes of illustration, the techniques described herein make reference to a specific application of the described mechanisms, namely within the context of optimizing the display of advertisements on a network-accessible page that comprises the results of a network search specified by a user. Such references are intended to illustrate the described mechanisms within a specific context to enable greater comprehension of the described mechanisms. However, the described mechanisms are equally applicable to any system that is implemented by one or more computing devices and whose performance can be quantifiably measured, where that system comprises a set of computer-executable instructions that receive input and provide output in accordance with a model whose parameters can be modified. As such, the references below to the specific context of the display of advertisements on a network accessible page are meant to be illustrative and exemplary only, and are not meant to limit the mechanisms described only to applications within that specific context.

Although not required, the descriptions below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
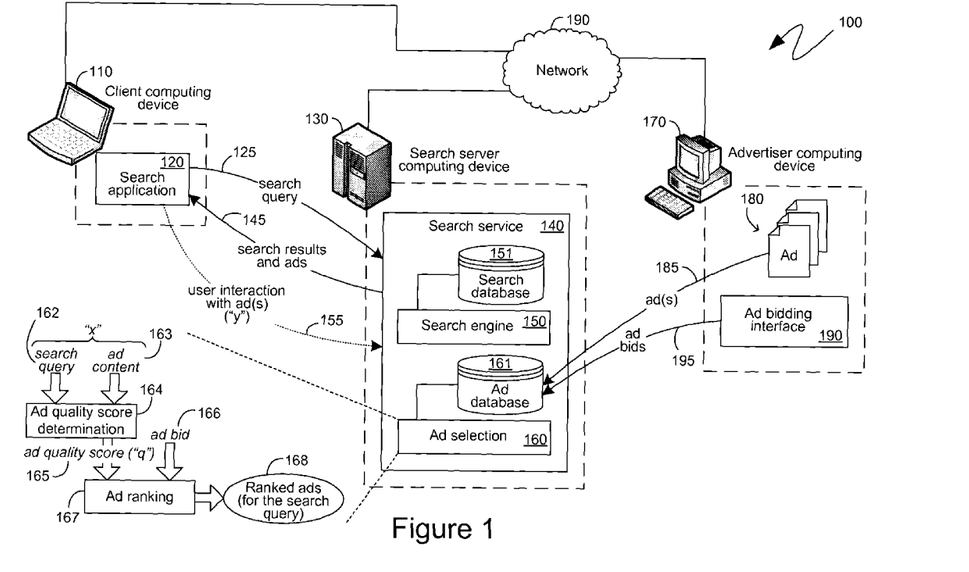
FIG. 1 is a block diagram of an exemplary network of computing devices.

Turning to FIG. 1, an exemplary system 100 is shown, comprising a client computing device 110, a server computing device, namely the search server computing device 130, an advertising computing device 170 and the network 190 enabling communications between two or more of the client computing device 110, the search server computing device 130 and the advertiser computing device 170. Although illustrated as separate computing devices 130 and 170, the mechanisms described herein are equally applicable to independent processes executing on a single server computing device, or for configurations in which components in either device 130 or 170 are split among different servers. The mechanisms described herein are also applicable to virtualized server computing devices, such as can be created by one or more processes executing on either a single physical computing device or across multiple physical computing devices. Computing devices 130 and 170, therefore, are meant to represent not just physical computing devices, but also virtualized computing devices, or any other like independent executing processes.

The client computing device 110, of the system 100 shown in FIG. 1, is illustrated as comprising a search application 120. In one embodiment, the search application 120 can be a dedicated application that provides a user of the client computing device 110 the ability to search the network 190, or otherwise provides a mechanism through which a user of the client computing device 110 can access one or more services being offered via the network 190. In an alternative embodiment, the search application 120 can be a general-purpose network browser that can simply be directed to, or otherwise utilize, a search service, such as that which could be provided by the search server computing device 130, which will be described in further detail below. Irrespective of whether the search application 120 is a dedicated application or a general-purpose browser, the search application 120 can communicate with a search service 140 that can be hosted by one or more server computing devices, such as the search server computing device 130.

A user of the client computing device 110 can utilize the search application 120, to search the network 190, by entering information into the search application 120, such as, for example, terms that the user wishes to search for. The search query, which can comprise the terms that the user entered, can be transmitted to the search service 140 being executed by the search server computing device 130, as illustrated by the communication 125, shown in the system 100 of FIG. 1. The terms of that search query can then be provided to a search engine 150 that can be part of the search service 140. Subsequently, the search engine 150 can reference a search database 151, such as in a manner well known to those skilled in the art, to identify one or more responsive entries in the search database 151, which can represent resources that are accessible via the network 190. Identifiers of those resources that are accessible via the network 190, and that have been identified by the search engine 150 as being relevant to the search query, can be returned to the user via the communication 145.

By providing the search query, such as via the communication 125, a user of the client computing device 110 can provide information to the search service 140 regarding that user's current interests. As such, providers of products or services that match the user's current interests would find it desirable to be able to advertise their products or services to such a user because such a user is more likely to purchase their products or services. Consequently, such providers would be willing to compensate the entity providing the search service 140 to have that entity display, together with the search results, transmitted via the communication 145, advertisements regarding those providers' products or services. More specifically, providers of products or services are typically willing to compensate the search service 140 if the user to whom the search results are sent not only is shown advertisements, but actually selects those advertisements and is, thereby, communicationally coupled with one or more computing devices that enable the user to purchase the products or services being advertised.

Consequently, in one embodiment, the search service 140 can further comprise an advertising selection component 160 that can reference a database of advertisements 161 and can identify advertisements that can also be provided to the user, via the communication 145. More specifically, the advertising selection component 160 can utilize the information in the search query, such as that received via the communication 125, to identify advertisements, from among the advertisement database 161, that can be relevant to such a search query. The identified advertisements can then be transmitted to the client computing device 110, such as via the communication 145, and can be displayed, such as via the search application 120, to a user of the client computing device 110. By identifying advertisements, from among the advertisement database 161, that can be relevant to a user's search query, the advertising selection component 160 can select advertisements that the user is more likely to select, because such advertisements can be more aligned with that user's current interests, as evidenced by the search query. In such a manner, by maximizing the likelihood that the user will select one or more advertisements that are presented to such user, the entity providing the search service 140 can attempt to maximize the compensation it receives from those advertisers.

As illustrated by the system 100 of FIG. 1, the advertising selection component 160, can comprise an advertising quality score determination component 164 and an advertising ranking component 167. The advertising quality score determination component 164 can apply a model, with modifiable parameters, for quantifying the likelihood that a user entering the search query 162 will select an advertisement having the advertisement content 163. As indicated previously, because the search service 140 can receive compensation from advertisers based on users' selection of displayed advertisements, the advertising quality score determination component 164 can be utilized by the advertising selection component 160 to identify those advertisements that a user submitting the search query 162 will be most likely to select. Such an identification can be performed by generating an advertising quality score 165 that can represent the likelihood that a user entering the search query 162 will select an advertisement having the advertisement content 163. The advertisement content 163 can be obtained from advertisements, such as the advertisements 180, that can be generated by an advertiser, such as on an advertiser computing device 170, and communicated to the search service 140, for storage in the advertisement database 161, via the communication 185.

Once the advertising quality score determination component 164 has determined advertising quality scores 165 for the advertisements in the advertisement database 161, an advertisement ranking component 167 can generate a ranking 168 of the advertisements such that the top ranked advertisements can be selected, with some variability, by the advertisement selection component 160 to be communicated to the user, via the communication 145. The advertisement ranking component 167 can take into account not only an advertisements quality score 165, or likelihood that a user will select such advertisement, but can also take into account an advertiser's bid 166, or the amount the advertiser would be willing to compensate the search service 140 if a user selects that advertisement. As will be recognized by those skilled in the art, it is economically rational to select advertisements having a lower quality score 165, or likelihood that they will be selected by a user, if the advertiser's bid 166 for such advertisements is sufficiently high to overcome such a lower possibility that the user will select the advertisements. For example, it is economically better to have a 10% chance of being compensated $100, than a 20% chance of being compensated $40. An advertisement bidding interface 190, such as can be executed by an advertiser on an advertiser computing device 170, can interface with the search service 140 to enable the advertiser to specify the amount of compensation, or "bid", that the advertiser is willing to compensate the search service 140 if a user selects a particular advertisement. Such bids can be communicated, such as from an advertiser computing device 170, to the search service 140 via the communication 195. Once received, information regarding such bids can also be stored in the advertisement database 161.

Once the ranked set of advertisements 168, is generated for the particular search query that was received via the communication 125, the advertisement selection component 160 can select the highest ranked advertisements, from the ranked set of advertisements 168, in accordance with various presentation considerations, such as how many advertisements to display with the search results, the location of such advertisements, and other like considerations. The selected advertisements can then be included with the search results generated by the search engine 150, and communicated back to the search application 120, executing on the client computing device 110, by the communication 145. Optionally, if the user of the client computing device 110 interacts, or selects, one or more of the advertisements provided via the communication 145, a notification can be returned to the search service 140, such as via the communication 155, indicating the user's interaction with one or more of the advertisements, and specifying the advertisement. Ultimately, it can be the user's interaction with advertisements, such as communicated via the communication 155, that can determine the compensation received by the search service 140 and, consequently, can determine the economic performance of the search service 140.

To optimize the economic performance of the search service 140, the quantity of advertisements that the user selects should be increased, as should the advertisers' bids for those advertisements. Both metrics, however, can be dependent upon the ability of the advertisement selection component 160 to select advertisements that are enticing to the user, since that will not only increase the number of advertisements that are selected by the user, but will also cause advertisers to be willing to pay more to have their advertisements presented by the search service 140. As indicated previously, it is the advertisement quality score determination component 164 that can assign advertisement quality scores 165 to advertisements that can reflect the estimated likelihood that a user providing the search query 162 will find an advertisement with the advertisement content 163 sufficiently enticing to cause the user to select such an advertisement. Consequently, the advertisement selection component 160 can be improved to select advertisements that are more enticing to the user if the advertisement quality score determination component 164 is optimized to most accurately predict whether a user, entering the search query 162, would select an advertisement with the advertisement content 163.

As will be recognized by those skilled in the art, however, attempting to predict human behavior can be complex and can be based on a myriad of adjustable parameters. For purposes of the descriptions below, it is sufficient that the mechanism implemented by the advertisement quality score determination component 164, to assign an advertisement quality score 165, given a search query 162 and an advertisement content 163, is a mechanism whose parameters can be adjusted, and which adjustments can result in different advertising quality scores 165 being assigned to the same advertisement, with the same advertisement content 163, given the same search query 162. Typically, as indicated previously, adjustments to the parameters utilized by the advertisement quality score determination component 164 could require that an advertisement selection component 160, implementing such a redesigned advertisement quality score determination component 164, be put into active service by the research service 140, and the user's selection, such as via the communication 155, of the advertisements provided by such an advertisement selection component 160 can be monitored to determine whether the adjustments to the parameters utilized by the advertisement quality score determination component 164 improved the advertisement selection process, and the overall financial performance of the search service 140. As also indicated previously, such testing methodology was inefficient and suboptimal for all of the reasons enumerated.

Instead, rather than separately testing each adjustment to the advertisement quality score determination component 164, a trial can be performed during which the parameters utilized, or the model implemented, by the advertisement quality score determination component 164 remain invariant. Instead, a perturbation, or noise, can be added to the advertisement quality score 165 generated by the advertisement quality score determination component 164. The perturbation, or noise, that can be added to the advertisement quality score 165 can be a random distribution such that, on average, the advertisement quality score 165 that is generated remains the same as it would have been without the noise.

Figure 2:
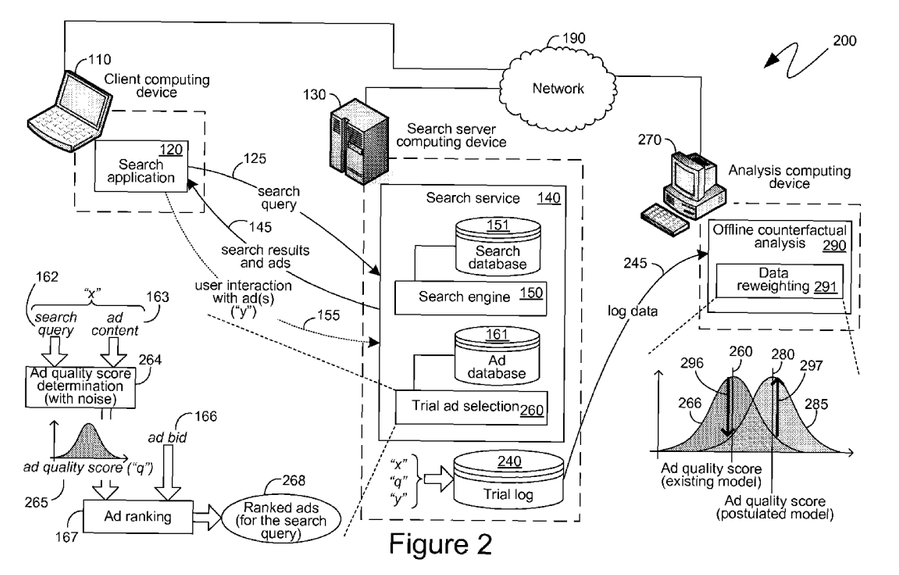
FIG. 2 is a block diagram of an exemplary offline counterfactual data gathering and analysis system.

Turning to FIG. 2, the system 200 shown therein illustrates an exemplary offline counterfactual analysis directed to the parameters of the advertisement quality score determination component 164 that was shown in FIG. 1. Initially, as shown in the system 200 of FIG. 2, a trial can be conducted with a trial advertisement selection component 260. The trial advertising selection component 260 can comprise an advertisement quality score determination component 264 that adds noise to get determined advertisement quality score. More specifically, the advertisement quality score determination component 264 can determine an advertisement quality score in the same manner as the advertisement quality score determination component 164 described previously, and illustrated in FIG. 1. Once such an advertisement quality score has been determined, a random amount of noise, or variation, can be added to that determined advertisement quality score to ultimately generate the advertisement quality score 265 that will be provided to the advertisement ranking component 167.

As will be recognized by those skilled in the art, and as illustrated in the system 200 of FIG. 2, the result of an addition of a random amount of noise, or variation, to a determined advertisement quality score can result in the advertisement quality scores 265, that are provided to the advertisement ranking component 167, conforming to a traditional Gaussian distribution around whatever value the determined advertisement quality score was prior to the introduction of the random amount of noise. As a simplistic example, and for purposes of further description, if a determined advertisement quality score, for a given search query 162 and a given advertisement having advertisement content 163, was a value of, for example, "5", then, each time such a search query 162 was provided, such as via the communication 125, an advertisement, having the advertisement content 163, would have, for example, a 40% chance of receiving an advertisement quality score of "5", a 20% chance of receiving an advertisement quality score of "4", another 20% chance of receiving an advertisement quality score of "6", a 7% chance of receiving an advertisement quality score of "3", another 7% chance of receiving an advertisement quality score of "7", and so on. Thus, at the end of the trial, if the search query 162 from the above example was provided, such as via the communication 125, to the search service 140, one hundred times, then an advertisement having the advertisement content 163, also from the above example, would have been provided the advertisement quality score of "5" in 40 of those instances of the search query 162 being received, an advertisement quality score of "6" in 20 instances, and advertisement quality score of "4" in another 20 instances, and so on.

The changes to the advertisement quality score 265 that is generated by the advertisement quality score determination component 264, when the noise is added, result in the advertisement ranking component 167 ranking the advertisements differently than if the noise were not introduced. Thus, unlike the collection of ranked advertisements 168, shown in FIG. 1, that would not change so long as the search query 162 and the ad content 163 remained invariant, the collection of ranked advertisements 268 shown in the system 200 of FIG. 2 can vary, and the ranked advertisements therein can be ranked differently, because of the noise added to the advertisement quality score 265. As a result, the advertisements that are actually selected by the trial advertisement selection component 260, and are presented to the user, such as through the communication 145, can, likewise, vary.

In one embodiment, the trial log 240 can be maintained that collects detailed information during the trial. As indicated by the variable notation shorthand in the system 200 of FIG. 2, one set of information that can be collected into the trial log 240 can be the individual search queries, such as the search query 162, that are received by the search service 140 during the trial. Likewise, the content of the advertisements in the advertisement database 161 during the trial can also be logged into the trial log 240. Because the advertisement quality score 265 can be varied by the addition of the above described noise, each individual advertisement quality score, given a particular search query 162, and advertisement content 163, can likewise be logged into the trial log 240. Lastly, the trial log 240 can record the ultimate effect of the variations in the advertisement quality score 265, by recording whether or not the user selected one or more of the advertisements that were displayed.

As will be recognized by those skilled in the art, the variation of the advertisement quality score 265, output by the advertisement quality score determination component 264, can result in the trial advertisement selection component 260 selecting advertisements, from the advertisement database 161, to be displayed to a user of the client computing device 110, such as via the communication 145, that would not have, traditionally, been selected for display to that user, given the search query 162 that that user provided. It is precisely this behavior, in collecting responsive data based on a situation that would not, normally, have occurred, that enables the offline counterfactual analysis to estimate the behavior of the system, given certain changes to the system, after the fact.

In particular, once the trial has completed, the addition of noise to the advertisement quality score 265 can be discontinued, and the advertisement quality score determination component 264 can resume its prior operation. At that point, the data from the trial log 240 can be analyzed by an offline counterfactual analysis component 290, such as by obtaining the log data from the trial log 240 via the communication 245, shown in the system 200 of FIG. 2. In one embodiment, the offline counterfactual analysis component 290 can be comprised of computer executable instructions that can be executed on a computing device remote from the search server computing device 130, such as, for example, the computing device 270, communicationally coupled to the network 190, as also shown in system 200 of FIG. 2.

As indicated previously, counterfactual analysis is analysis that considers what would have happened in a prior situation had certain factors been different at the time that the prior situation occurred. Consequently, in the embodiment illustrated in the system 200 of FIG. 2, the offline counterfactual analysis component 290 can be directed to analyzing how the performance of the search service 140 would have changed had a different set of parameters, or a different "model", been utilized to generate the advertisement quality scores 265. As will be recognized by those skilled in the art, the performance of the search service 140 can be quantified in many different ways. Traditionally, one or more key performance indicators can be defined to enable quantification of the performance of the search service 140. For example, one key performance indicator can be the amount of advertisements that were selected by users. Another key performance indicator can be the amount of revenue the search service 140 received, such as due to the selection of advertisements by users.

Generally speaking, the performance of any given page, or other collection of the search results and the advertisements, that is generated by the search service 140 can be expressed as a function of the advertisements that the user selected, the quality scores that were assigned to advertisements that determined which advertisements were even displayed to the user, the user's search query and the content of the advertisements available for display by the search service 140. In mathematical terms, this functional relationship can be expressed in the form of PagePerf($y_i,x_i,q_i$(M)), where the variable "y" represents the user's selection of one or more advertisements, as indicated in FIG. 2, the variable "x" represents the relevant input data including, for example, the search query 162 and the advertisement content 163, as also indicated in FIG. 2, and the variable "q" can represent the advertisement quality score, as also indicated in FIG. 2. Because the advertisement quality score can, itself, be generated based on a collection of modifiable parameters, or a "model", the variable "q" can, itself, be a function, namely of the model, nominated "M" in the mathematical expression above, that was utilized to generate the advertisement quality score "q". The performance of the overall search system 140 can then be quantified based on the average performance of the pages that were generated by it. Mathematically, the performance of the overall search system 140, given an advertisement quality score determination component that is determining advertisement quality scores by utilizing a model "M" can be expressed as:

$$SystemPerf(M) = \frac{1}{N}\sum_{i=1}^{N} PagePerf(y_i,x_i, q_i(M)).$$

The offline counterfactual analysis component 290 can, therefore, seek to determine how such a system performance would have changed if a different model had been utilized to generate the advertisement quality scores.

To be clear, the offline counterfactual analysis component 290 is not directed to determining what the effect the utilization of different parameters, by the advertisement quality score determination component 264, would have had on the generation of the advertisement quality scores themselves. Changes to the parameters utilized by the advertisement quality score determination component 264 change the advertisement quality score 265 in a known manner, since the advertisement quality score is mathematically, and thereby precisely, related to the parameters utilized and the relevant inputs, including the search query 162 and the advertisement content 163. Instead, what can be difficult, if not impossible, to accurately model is not the behavior of the mathematically precise advertisement quality score determination component 264, but rather what the effect would be, in the performance of the overall search service 140, including how the users of such a search service 140 would respond, if the parameters utilized by the advertisement quality score determination component 264 had been different. More specifically, would a different set of parameters, have resulted in increased user selection of advertisements, such as can be communicated to the search service 140 via the communication 155, given that the changes to the parameters utilized by the advertisement quality score determination component 264 would have resulted in different advertisements being selected by the advertisement selection component 260 for display to the user.

The offline counterfactual analysis component 290 can estimate what would have been the key performance indicators of the search service 140, had a different set of parameters been utilized by, for example, the advertisement quality score determination component 264 to generate the advertisement quality scores 265. Indeed, as indicated previously, while the operation of the offline counterfactual analysis 290 is being presented within the specific context of advertisement selection in conjunction with the delivery of network-accessible search results, the described offline counterfactual analysis mechanisms are not so limited. Instead, the offline counterfactual analysis mechanisms described can be utilized to perform offline counterfactual analysis of any system whose output is influenced by adjustable parameters and whose output impacts the performance of such a system in an unknown manner, such that the offline counterfactual analysis mechanisms can estimate what the performance of such a system would have been had different output been generated due to the utilization of different parameters.

In one embodiment, the offline counterfactual analysis component can estimate the performance of a system by re-weighting the data received from a trial within which that system was operated with random perturbations, or noise, added to its output to simulate the operation of that system with different parameters. For example, in the particular implementation illustrated by the system 200 of FIG. 2, the offline counterfactual analysis component 290 can estimate what the performance of the search service 140, such as defined above, would have been had the advertisement quality score determination component 264 utilized different parameters, such as defined by a different advertisement quality score determination model, to derive the advertisement quality scores 265. Initially, the offline counterfactual analysis component 290 can obtain the data from the trial log 240, such as via the communication 245. Subsequently, a data re-weighting component 291, that can be part of the counterfactual analysis component 290, can derive weighting factors to the data received from the trial log 240 so as to estimate what would have happened had a different set of parameters been utilized by the advertisement quality score determination component 264 during the collection of that data.

As indicated previously, random noise can have been added to advertisement quality scores 265 such that the scores that were provided to the advertisement ranking component 167, given the same search query 162 and the same advertisement content 163, can have varied in accordance with a Gaussian distribution centered around whatever advertisement quality score would traditionally have been generated, given that search query 162 and that advertisement content 163. Since the randomization would have been centered around whatever advertisement quality score would traditionally have been generated, averaging such advertisement quality scores will cancel out the randomized noise. As a result, despite the addition of the randomized noise, the overall performance of the search service 140 may not have been impacted by such an addition. However, for purposes of determining the performance of the overall search service 140, the above defined performance can be modified to take into account this distribution of advertisement quality scores 265. For example, the advertisement quality score is no longer a singular value, but rather, with the addition of the random perturbations, can now be represented as the sum of individual values multiplied by the likelihood of those values actually having been provided to the advertisement ranking component 167 as the advertisement quality score 265. As will be recognized by those skilled in the art, this can be mathematically expressed more accurately using integral notation:

$$ExpectedSystemPerf(M) = \Sigma_{i=1}^{N} \int PagePerf(y_i, x_i, q) p_M(q|x_i) dq$$

where the term "$p_M$" can represent the probability distribution of the advertisement quality score 265 with the added random noise.

The offline counterfactual analysis component 290 can estimate what the system performance of the search service 140 would have been had the advertisement quality score determination component 264 been utilizing a different set of parameters for deriving the advertisement quality scores 265 by first considering how such different parameters would have impacted the advertisement quality score 265 that would have been derived by the advertisement quality score determination component 264. Once such a new advertisement quality score 265 can be determined, such as by simulating the operation of the mathematically precise advertisement quality score determination component 264, the offline counterfactual analysis component 290 can estimate what the system performance of the search service 140 would have been by generating an estimated system performance based on the advertisement quality score determination component 264 continuing to add randomized noise to the advertisement quality scores it determines, such that the advertisement quality scores to be utilized for the estimate of the system performance can be based on a Gaussian distribution around the advertisement quality score that the advertisement quality score determination component 264 would have generated utilizing the new parameters being considered. As indicated previously, such an addition of randomized noise can not impact the ultimate computation of system performance and, as a result, the above assumption does not substantially impact the accuracy of the estimate of what the system performance would have been utilizing the counterfactual parameters. As utilized herein, the term "counterfactual parameters" means those parameters for which the counterfactual analysis is being performed; namely the parameters that are the basis of the counterfactual consideration of what would the performance of a system have been had those parameters been utilized instead.

Mathematically, the estimate of the system performance of the search service 140, had the advertisement quality score determination component 264 been utilizing a different set of parameters for deriving the advertisement quality scores 265, that can be generated by the offline counterfactual analysis component 290 can be expressed as:

$$ExpectedSystemPerf(M') = \frac{1}{N} \sum_{i=1}^{N} \int PagePerf(y_i, x_i, q) p_{M'}(q|x_i) dq,$$

where the term "M'" represents the model of generating the advertisement quality scores 265 utilizing the counterfactual parameters. Of course, as will be recognized by those skilled in the art, it can be difficult to generate such an expected performance estimate directly because the data that was collected by the trial log 240 contains examples sampled from $p_M(q|x_i)$ instead of $p_{M'}(q|x_i)$.

Thus, in one embodiment, the data that was collected by the trial log 240 can be re-weighted to reflect a probability distribution of advertisement quality scores that would have been generated by the advertisement quality score determination component 264 had that component been utilizing the counterfactual parameters, instead of the probability distribution of advertisement quality scores 265 upon which the data collected by the trial log 264 was actually based. Such a re-weighting can be performed by the data re-weighting component 291 of the offline counterfactual analysis component 290. The system 200 of FIG. 2 illustrates one exemplary re-weighting that can be performed by the data re-weighting component 291. As can be seen, the advertisement quality scores 265 that were generated by the advertisement quality score determination component 264, and upon which the data in the trial of 240 is collected, can conform to a probability distribution 266 around an advertisement quality score 260 that represents the advertisement quality score that would have been assigned by the advertisement quality score determination component 264 absent the addition of the randomized noise. Conversely, the advertisement quality scores 265 that would have been generated by the advertisement quality score determination component 264, had that component been implementing the counterfactual factors, can conform to a probability distribution 285 around an advertisement quality score 280 that represents the advertisement quality score that would have been assigned by the advertisement quality score determination component 264, implementing the counterfactual parameters, absent the addition of the randomized noise.

The data re-weighting that can be performed by the data re-weighting component 291 can be based on the re-weighting that can be performed to transform the probability distribution 266, upon which the data in the trial log 240 was collected, into the probability distribution 285, upon which the data in the trial log 240 would have been collected had the advertisement quality score determination component 264 been implementing the counterfactual parameters being analyzed by the offline counterfactual analysis component 290. As shown in the system 200 of FIG. 2, the data re-weighting that is performed by the data re-weighting component 291 can, for example, as illustrated by the arrow 296, reduce the relative importance of the data collected when the advertisement quality score 265 that was assigned by the advertiser quality score determination component 264 had an advertisement quality score value 260 and can also, for example, as illustrated by the arrow 297, increase the relative importance of the data collected when the advertisement quality score 265 had an advertisement quality score value 280.

To more concretely describe the data re-weighting performed by the data re-weighting component 291, reference is again made to the above simplistic example where an exemplary advertisement quality score value of "5" was utilized as the advertisement quality score value 260 around which the distribution of advertisement quality scores 266 would have been centered for a given search query 162 and a given advertisement content 163. In that simplistic example, there was a 40% chance of receiving an advertisement quality score of "5", a 20% chance of receiving an advertisement quality score of "4", another 20% chance of receiving an advertisement quality score of "6", a 7% chance of receiving an advertisement quality score of "3", another 7% chance of receiving an advertisement quality score of "7", and so on. Consequently, at the end of the trial, if the search query 162 from the above example was provided, such as via the communication 125, to the search service 140, one hundred times, then an advertisement having the advertisement content 163, also from the above example, would have been provided the advertisement quality score of "5" in 40 of those instances of the search query 162 being received, and advertisement quality score of "6" in 20 instances, and advertisement quality score of "4" in another 20 instances, and so on.

The data associated with each of those instances, including whether or not the user selected any of the advertisements displayed, can have been collected by the trial log 240 and can be utilized by the offline counterfactual analysis 290 to estimate a system performance of the search service 140 had the advertisement quality score determination component 264 been utilizing a different set of parameters and, thereby, generating advertisement quality scores distributed around an advertisement quality score value 280, as illustrated by the distribution 285. For example, had the advertisement quality score determination component 264 been utilizing the counterfactual parameters, it can have assigned an exemplary advertisement quality score value of "7" to advertisements having advertisement content 163, when a search query 162 was received. Again, in accordance with the above simplistic example, the probability distribution 285 can then be of the form where the advertisement quality score value of "7" would be assigned in 40% of the instances, an advertisement quality score value of "8" can have been assigned in 20% of the instances, an advertisement quality score value of "6" can have been assigned another 20% of the instances, an advertisement quality score value of "9" can have been assigned in 7% of the instances, an advertisement quality score value of "5" can have been assigned in another 7% of the instances, and so on. If the above exemplary one hundred instances of the particular search query 162 that were received during the trial had been received when the advertisement quality score determination component 264 was generating advertisement quality scores 265 utilizing the counterfactual parameters, then, instead of having an advertisement quality score value of "5" having been assigned to 40 of those instances, the advertisement quality score value of "5" can have been assigned to only seven of those instances. Analogously, instead of having an advertisement quality score value of "7" having been assigned to only seven of those instances, the advertisement quality score determination component 264, when utilizing the counterfactual parameters, would have assigned an advertisement quality score value of "7" in 40 of those instances.

Thus, given the data collected by the trial log 240 for those exemplary one hundred instances where the particular search query 162 was received, the data collected when the advertisement quality score 265, as assigned by the advertisement quality score determination component 264, had a value of "7" can be increased in importance to reflect, not the seven instances in which that value was actually assigned, but rather to simulate the assigning of that value in 40 instances. Similarly, the data collected by the trial log 240 when the advertising quality score 265 had been assigned a value of "5" can be decreased in importance to reflect, not the 40 instances in which that value was actually assigned, but rather to simulate the assigning of that value in only seven instances. As shown by the system 200 of FIG. 2, the data re-weighting component 291 can re-weight the data obtained from the trial log 240 to, for example, as illustrated by the arrow 296, decrease the relative importance of data collected with the advertisement quality score value 260, which can represent the advertisement quality score value of "5" in the simplistic example above, and to, for example, as illustrated by the arrow 297, increase the relative importance of data collected with the advertisement quality score value 280, which can represent the advertisement quality score value of "7" in the simplest example above.

The data re-weighting performed by the data re-weighting component 291 can be based on a ratio between the probability that a particular search query 162 and a particular advertisement content 163 would have resulted in the advertisement quality score determination component 264 generating a particular advertisement quality score utilizing the counterfactual parameters as compared to the probability that that same search query 162 and advertisement content 163 resulted in the advertisement quality score determination component 264 generating that same advertisement quality score utilizing the parameters with which the trial was conducted. Mathematically, this can be expressed as $$\frac{p_{M'}(q_i(M))}{p_M(q_i(M))},$$

where "$p_{M'}$" can represent the probability distribution of the advertisement quality scores as they would have been generated had the advertisement quality score determination component 264 been utilizing the counterfactual parameters, while "$p_M$" can represent the probability distribution of the advertisement quality scores as they actually were generated by the advertisement quality score determination component 264 during the trial whose data was logged the trial log 240.

Thus, the offline counterfactual analysis component 290 can estimate a system performance of the search service 140 based on the data in the trial log 240 as re-weighted by the data re-weighting component 291. More specifically, each data element in the trial log 240 can be re-weighted based on a re-weighting factor for that specific data element, as determined by the data re-weighting component 291. Mathematically, this can be expressed as $$SystemPerf(M') \approx \frac{1}{N}\sum_{i=1}^{N} PagePerf(y_i, x_i, q_i(M)) \times w_i$$

where the term "$w_i$" is equal to the ratio described above, namely, $$\frac{p_{M'}(q_i(M))}{p_M(q_i(M))},$$

As will be recognized by those skilled in the art, the term "PagePerf($y_i$, $x_i$, $q_i(M)$)" is based on, and is determinable from, the data that was collected during the trial and that is in the trial log 240, as indicated. In particular, the same estimation of the system performance of the search service 140 that was described above in order to account for the variability of the advertisement quality scores can likewise be utilized in the estimation of what the system performance of the search service 140 would have been if the advertisement quality score determination component 264 was utilizing the counterfactual parameters and was still adding the randomly generated noise to the generated advertisement quality scores. Mathematically, accounting for the above described re-weighing, $$ExpectedSystemPerf(M') = \frac{1}{N}\sum_{i=1}^{n} \int PagePerf(y_i, x_i, q) \times p_{M'}(q) dq,$$

which is just $$ExpectedSystemPerf(M') =$$

$$\frac{1}{N}\sum_{i=1}^{n} \int PagePerf(y_i, x_i, q) \times \frac{p_{M'}(q)}{p_M(q)} p_M(q) dq,$$

where $$\frac{p_{M'}(q)}{p_M(q)}$$

is the re-weighting factor described above.

In one embodiment, the above described re-weighting can be utilized by the offline counterfactual analysis component 290 when there is meaningful overlap between the probability distribution 266 of the advertisement quality scores that were generated during the trial and the probability distribution 285 of the advertisement quality scores that would have been generated had the advertisement quality score determination component 264 been utilizing the counterfactual parameters. Such can typically be the case where the counterfactual parameters being considered are similar to the parameters that were utilized during the trial. If, however, the offline counterfactual analysis component 290 is to consider what effect a more substantially different set of parameters would have had, the offline counterfactual analysis component 290 may not be able to generate a meaningful estimate of the system performance of the search service 140. Instead, however, in one embodiment, the offline counterfactual analysis component 290 can generate an indication, such as in the form of a vector, indicating in the direction, and magnitude, in which the system performance of the search service 140 would have changed had this more substantially different model been implemented by, for example, the advertising quality score determination component 264.

In such an embodiment, the offline counterfactual analysis component 290 can generate the indication as to the direction and magnitude of the change of the system performance of the search service 140, had the advertisement quality score determination component 264 utilized the more substantially different parameters, by determining an incremental change of the system performance of the search service 140 given an incremental change in the parameters utilized by the advertisement quality score determination component 264 such that those parameters are incrementally closer to the counterfactual parameters within the parameters that were utilized during the trial. In mathematical terms, the offline counterfactual analysis component 290 can generate a derivative of the system performance of the search service 140 as the parameters utilized by the advertising quality score determination component 264 change, or $$\frac{\partial SystemPerf(M)}{\partial M} \approx \frac{1}{N}\sum_{i=1}^{N} PagePerf(y_i, x_i, q_i(M)) \times \frac{\partial \log p_M(q_i(M))}{\partial M},$$

where, as before, the term "PagePerf($y_i$, $x_i$, $q_i(M)$)" is based on the data that was collected during the trial and that is in the trial log 240.

As can be seen, therefore, this vector can be generated utilizing the data that was collected during the trial and that is in the trial log 240. In particular, the vector can be generated by multiplying the page performance, as determined by the data in the trial log 240, with a derivative of the logarithm of the probability distribution of the advertisement quality score with respect to changes in the model, or the set of parameters, utilized by the advertisement quality score determination component 264.

In such an embodiment, each component of the determined vector can describe how the system performance of the search service 140 can change when there is an incrementally small change to a single parameter. These components can then be combined to estimate directional derivatives that describe how the system performance of the search service 140 can change when there are incrementally small changes to a combination of parameters at once. In such a manner, while the offline counterfactual analysis component 290 may not be able to directly estimate the system performance of the search service 140 had the advertisement quality score determination component 264 generated advertisement quality scores 265 utilizing a different set of parameters that vary more substantially from the set of parameters that were actually utilized during the trial, the offline counterfactual analysis component 290 can, at least, indicate whether such counterfactual parameters would have changed the system performance of search service 140 in a desirable manner.

In certain situations, a trial during which perturbations are added to the output of a system can result in external factors behaving in such a manner to counteract the added perturbations, thereby rendering the analysis of the data collected by the trial log 240, such as by the offline counterfactual analysis component 290, more difficult. For example, as indicated, the addition of perturbations to the advertisement quality scores 265 that are generated by the advertisement quality score determination component 264 can result in the advertisement ranking component 167 generating an advertisement ranking 268 different than it normally would, thereby further resulting in the trial advertisement selection component 260 selecting different advertisements than it normally would for display to a user. Such changes in the advertisements that are displayed to a user can result in advertisers changing the amount of compensation that they are willing to provide to the search service 140. For example, if the perturbations to the advertisement quality scores 265 cause an advertiser's advertisements to be displayed less often, that advertiser can increase the amount of compensation that they are willing to provide to the search service 140 by increasing their advertisement bid 166. Since the advertisement linking component 167 can generate the rank advertisements 268 based both on the advertisement quality scores 265 in the advertisement bid 166, changes to the advertisement bid 166 can act to counterbalance changes to the advertisement quality score 265, thereby nullifying the perturbations that were added to the advertisement quality scores 265 during the trial.

To account for such behavior, in one embodiment, it can be assumed that advertisers act in an economically rational manner. As a result, the perturbations that were added to the advertisement quality scores 265 can, instead, be regarded as perturbations to the advertisement bid 166, since either can have resulted in the advertisement ranking component 167 generating different advertisement rankings 268. The derivative of the total compensation provided by an advertiser, to the search service 140, with respect to the number of times that a user selected their advertisement, such as was communicated to the search service 140 by the communication 155, can reveal how much more such advertisers are willing to pay for additional user selections of their advertisements; in other words, what their marginal cost is. Since the trial log 240 can comprise both information regarding the changes to the advertisement quality score 265, which can, instead, be considered as changes to the advertisement bid 166, and can also comprise data regarding how often a user interacted, or selected, the displayed advertisements, the offline counterfactual analysis component 290 can generate information regarding the advertisers' marginal cost, thereby enabling the search service 140 to adjust its pricing to maximize its revenue.

Figure 3:
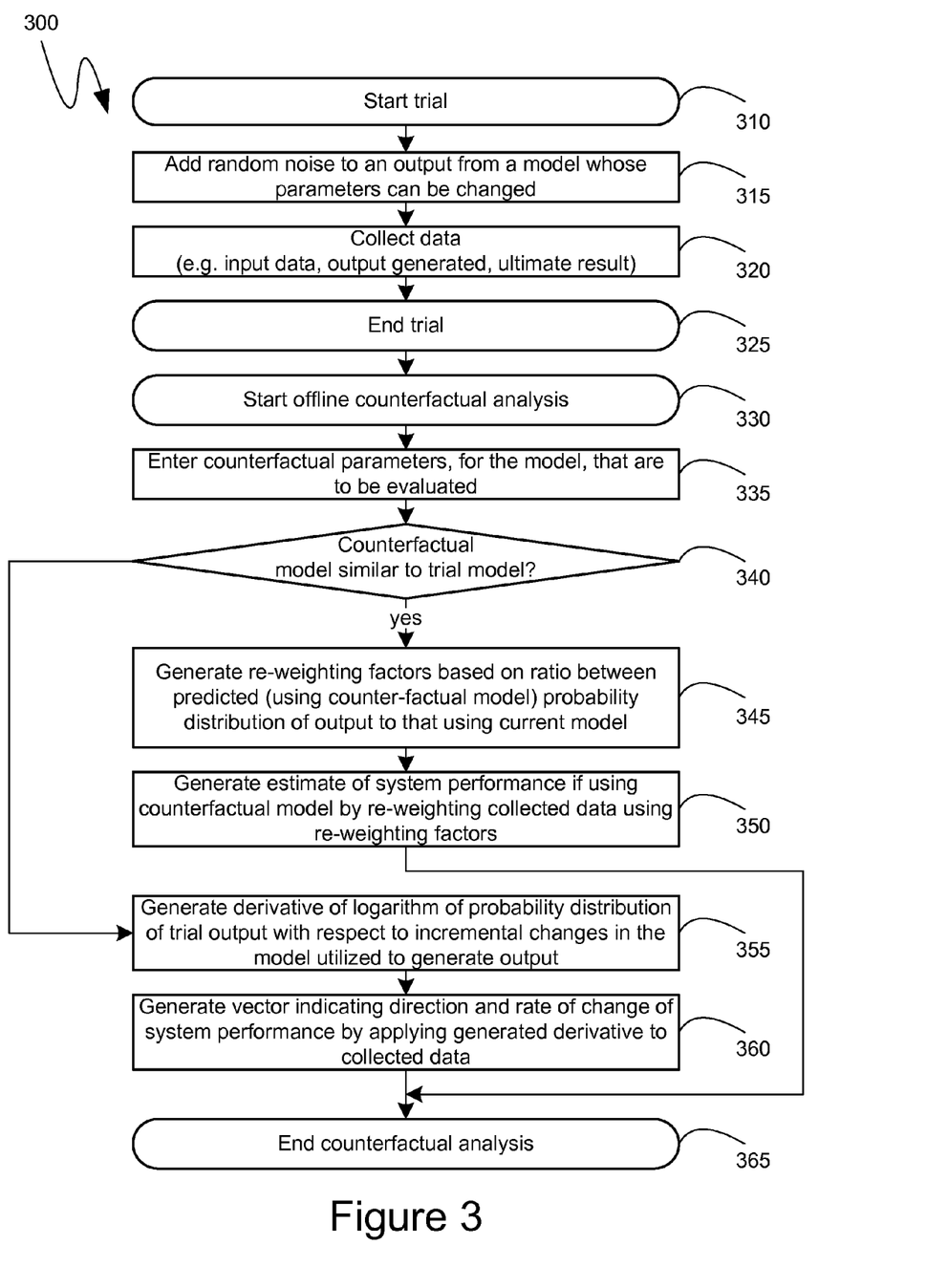
FIG. 3 is a flow diagram of an exemplary operation of an offline counterfactual data gathering and analysis mechanism.

Turning to FIG. 3, the flow diagram 300 shown therein illustrates an exemplary series of steps by which offline counterfactual analysis can be performed on a system. Initially, as shown by the flow diagram 300 of FIG. 3, a trial can be commenced at step 310 during which random noise can be added to the output of a component that generates such output from one or more inputs utilizing a model whose parameters can be changed. This random noise, or perturbations, can be added to that output at step 315, and, at step 320, the relevant data can be collected. Such data can include the input that was received, the output, with the random perturbations, that was generated, and the ultimate result, such as how the generated output, with the random perturbations, was received, and responded to, by another party. Subsequently, at step 325, the trial can end.

At step 330, an offline counterfactual analysis can be started utilizing the data collected during the trial, such as at step 320. As part of the counterfactual analysis, parameters to be evaluated, which, as indicated previously, are referred to herein as "counterfactual parameters", can be entered at step 335. To determine what the results would have been had the model been using the counterfactual parameters, a determination can first be made, at step 340, as to the similarity between the counterfactual model, being based on the counterfactual parameters, and the model and parameters that were used during the trial. If, at step 340, it is determined that the counterfactual parameters are not substantially different from the parameters that were utilized during the trial, processing can proceed with step 345 where re-weighting factors can be generated based on the ratio between a predicted probability distribution of the output of the counterfactual model, and the probability distribution of the output of the model as observed during the trial. Subsequently, at step 350, an estimate of the system performance if the system had been utilizing the counterfactual model, can be generated by re-weighting the data collected during the trial, such as at step 320, with the re-weighting factors that were generated at step 345. The counterfactual analysis can then end at step 365.

If, on the other hand, at step 340, it is determined that the counterfactual parameters are substantially different from the parameters that were utilized during the trial, processing can proceed with step 355, where a derivative can be generated that is a derivative of the logarithm of the probability distribution of the output that was generated during the trial with respect to incremental changes in the model utilized to generate that output. At step 360, then, a vector can be generated by applying that generated derivative, from step 355, to the collected data. The vector generated at step 360 can indicate a direction and the rate of change of the system performance as the parameters of the model are incrementally changed towards the counterfactual model. As before, the counterfactual analysis can then end at step 365.

Figure 4:
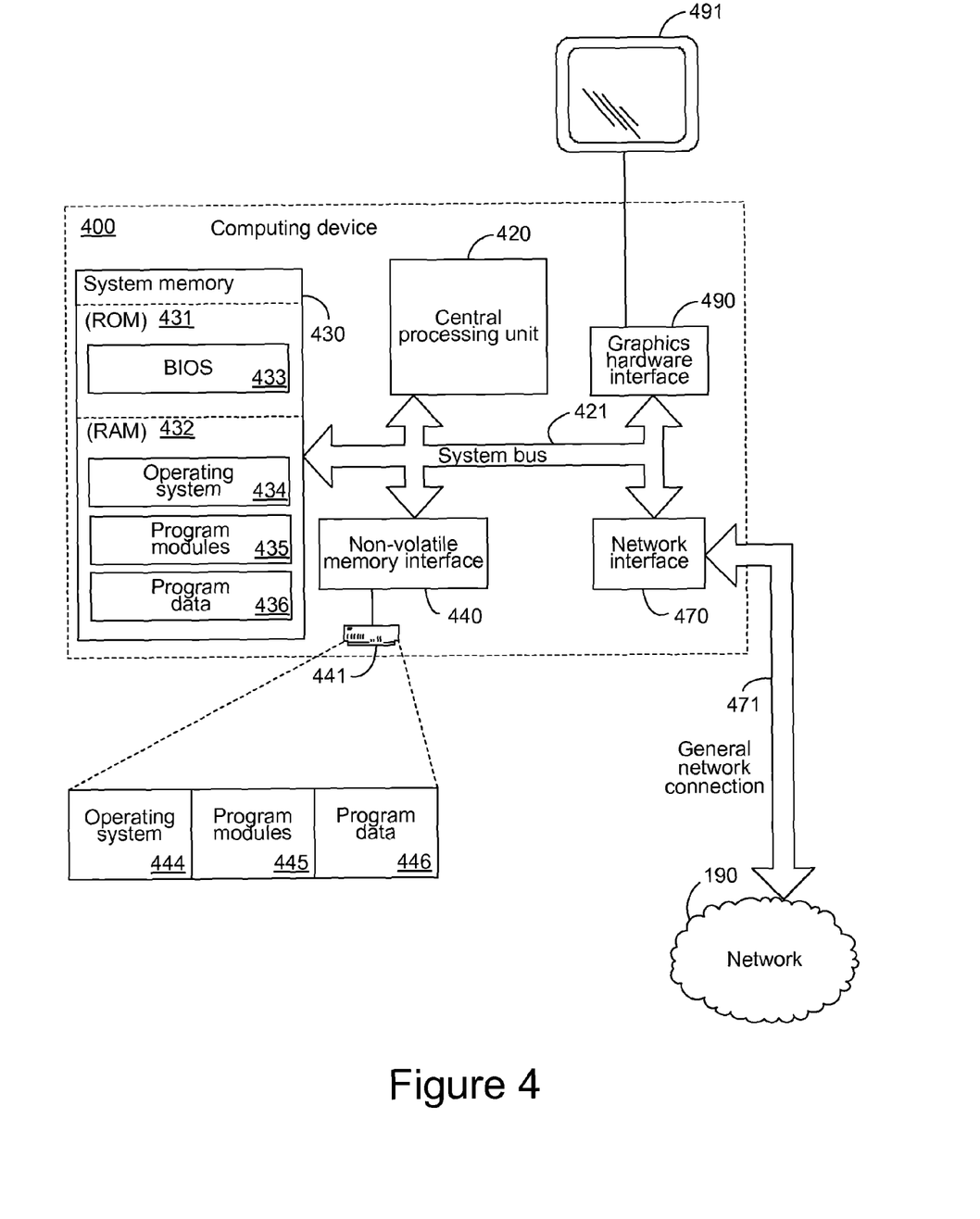
FIG. 4 is a block diagram of an exemplary computing device.

Turning to FIG. 4, an exemplary computing device 400 is illustrated. The exemplary computing device 400 can be any one or more of the client computing device 110 and the server computing devices 130 and 170 illustrated in FIG. 1, whose operations were described in detail above. For example, the exemplary computing device 400 can be a server computing device or a computing device that can be executing one or more processes that can represent the server computing devices 130 and 170 illustrated in FIG. 1, such as, for example, by executing one or more processes that create virtual computing environments that can provide for the operations detailed above. The exemplary computing device 400 of FIG. 4 can include, but is not limited to, one or more central processing units (CPUs) 420, a system memory 430, that can include RAM 432, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, such as for the display of visual user interfaces, including, but not limited to, a graphics hardware interface 490 and a display device 491. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and the aforementioned RAM 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates the operating system 434 along with other program modules 435, and program data 436.

The computing device 400 may also include other removable/non-removable, volatile/nonvolatile computer storage media. By way of example only, FIG. 4 illustrates the hard disk drive 441 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 can operate in a networked environment using logical connections to one or more remote computers. The computing device 400 is illustrated as being connected to the general network connection 471 through a network interface or adapter 470 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

As can be seen from the above descriptions, mechanisms for performing offline, or after-the-fact, counterfactual analysis have been presented. In view of the many possible variations of the subject matter described herein, we claim as our invention all such embodiments as may come within the scope of the following claims and equivalents thereto.

We claim:

1. One or more computer-readable storage media comprising computer-executable instructions for generating an estimated system performance utilizing offline counterfactual analysis, the computer-executable instructions, when executed by one or more processing units of a computing device causing the computing device to perform steps comprising:

adding random perturbations to an original output of a component of a system to generate a perturbed output, wherein the system is implemented by one or more computing devices and wherein further the component of the system comprises a set of computer-executable instructions that receive one or more inputs and generate the original output in accordance with a model that is implemented by the set of computer-executable instructions and that comprises modifiable parameters;

collecting data for each instance of an operation of the system, collected data comprising the one or more inputs, the perturbed output, and one or more results of the operation of the system for that instance, wherein the performance of the system is derived from the one or more results;

obtaining one or more counterfactual parameters for the component of the system;

generating non-zero re-weighting factors;

re-weighting the collected data with the non-zero re-weighting factors to emphasize data collected when the perturbed output matched an expected output that would have been generated by the component if the component was utilizing a counterfactual model comprising the counterfactual parameters; and generating, with the re-weighted data, an estimate of what a performance of the system would have been if the component had utilized the counterfactual model comprising the counterfactual parameters.

2. The computer-readable storage media of claim 1, wherein the perturbed output varies in accordance with a probability distribution centered around the original output.

3. The computer-readable storage media of claim 1, wherein the non-zero re-weighting factors are generated based on a ratio between a predicted probability distribution of the perturbed output of the component if the component was utilizing the counterfactual model comprising the counterfactual parameters and the probability distribution of the perturbed output of the component.

4. The computer-readable storage media of claim 1, comprising further computer-executable instructions for generating, if the one or more obtained counterfactual parameters are substantially different from corresponding parameters utilized during the collecting the data, a vector indicating a magnitude and a direction of change of the performance of the system for an incremental change in the model; wherein the computer-executable instructions for re-weighting the collected data and generating the estimate are only performed if the one or more obtained counterfactual parameters are not substantially different from the corresponding parameters utilized during the collecting the data.

5. The computer-readable storage media of claim 4, wherein the computer-executable instructions for generating the vector comprise computer-executable instructions for generating the vector based on a derivative of a logarithm of a probability distribution of the perturbed output with respect to changes in the model.

6. The computer-readable storage media of claim 1, wherein: the system is an advertisement presentation system; the component is an advertisement quality score determination component; the perturbed output is an advertisement quality score provided to an advertisement ranking component for generating a ranking of advertisements from which advertisements to be presented are selected; and the performance of the system is based on a compensation received for users selecting advertisements presented by the advertisement presentation system.

7. The computer-readable storage media of claim 6, wherein the advertisement presentation system comprises a search engine; and wherein further the one or more inputs of the advertisement quality score determination component comprise an advertisement content of the advertisement for which a quality score is being generated and a search query, the selected advertisements being presented with search results that are responsive to the search query.

8. A method for generating an estimated system performance utilizing offline counterfactual analysis, the method comprising the steps of:
utilizing a trial component executing on a computing device to modify computer-readable data stored on a computer-readable storage medium, the computer-readable data comprising an original output of a component of a system to generate a perturbed output, the component of the system comprising a set of computer-executable instructions that receive one or more inputs and generate the original output in accordance with a model that is implemented by the set of computer-executable instructions and that comprises modifiable parameters;
generating a trial log comprising computer-readable data, stored on a computer-readable storage medium, for each instance of an operation of the system, the trial log comprising the one or more inputs, the perturbed output, and one or more results of the operation of the system for that instance, wherein the performance of the system is derived from the one or more results;
obtaining one or more counterfactual parameters for the component of the system;
generating non-zero re-weighting factors;
utilizing a data reweighting component executing on an analysis computing device to re-weight the computer-readable data of the trial log with the non-zero re-weighting factors to emphasize data collected when the perturbed output matched an expected output that would have been generated by the component if the component was utilizing a counterfactual model comprising the counterfactual parameters; and
utilizing an offline counterfactual analysis component executing on the analysis computing device to generate, with the re-weighted data, a computer-generated estimate of what a performance of the system would have been if the component had utilized the counterfactual model comprising the counterfactual parameters.

9. The method of claim 8, wherein the perturbed output varies in accordance with a probability distribution centered around the original output.

10. The method of claim 8, wherein the non-zero re-weighting factors are generated based on a ratio between a predicted probability distribution of the perturbed output of the component if the component was utilizing the counterfactual model comprising the counterfactual parameters and the probability distribution of the perturbed output of the component.

11. The method of claim 8, further comprising the steps of: utilizing the offline counterfactual analysis component executing on the analysis computing device to generate, if the one or more obtained counterfactual parameters are substantially different from corresponding parameters utilized during the collecting the data, a vector indicating a magnitude and a direction of change of the performance of the system for an incremental change in the model; wherein the re-weighting the collected data and utilizing the offline counterfactual analysis component executing on the analysis computing device to generate the estimate are only performed if the one or more obtained counterfactual parameters are not substantially different from the corresponding parameters utilized during the generating the trial log.

12. The method of claim 11, wherein the utilizing the offline counterfactual analysis component executing on the analysis computing device to generate the vector comprises generating the vector based on a derivative of a logarithm of a probability distribution of the perturbed output with respect to changes in the model.

13. The method of claim 8, wherein: the system is an advertisement presentation system; the component is an advertisement quality score determination component; the perturbed output is an advertisement quality score provided to an advertisement ranking component for generating a ranking of advertisements from which advertisements to be presented are selected; and the performance of the system is based on a compensation received for users selecting advertisements presented by the advertisement presentation system.

14. The method of claim 13, wherein the advertisement presentation system comprises a search engine; and wherein further the one or more inputs of the advertisement quality score determination component comprise an advertisement content of the advertisement for which a quality score is being generated and a search query, the selected advertisements being presented with search results that are responsive to the search query.

15. A system for generating an estimated system performance utilizing offline counterfactual analysis, the system comprising:
a component comprising computer-executable instructions that receive one or more inputs and generate an original output in accordance with a model that is implemented by the computer-executable instructions and that comprises modifiable parameters; and
one or more computing devices performing steps comprising:
adding random perturbations to the original output of the component to generate a perturbed output;
collecting data for each instance of an operation of the system, the collected data comprising the one or more inputs, the perturbed output, and one or more results of an operation of the system for that instance, wherein the performance of the system is derived from the one or more results;
obtaining one or more counterfactual parameters for the component;
generating non-zero re-weighting factors;
re-weighting the collected data with the non-zero re-weighting factors to emphasize data collected when the perturbed output matched an expected output that would have been generated by the component if the component was utilizing a counterfactual model comprising the counterfactual parameters; and generating, with the re-weighted data, an estimate of what a performance of the system would have been if the component had utilized the counterfactual model comprising the counterfactual parameters.

16. The system of claim 15, wherein the perturbed output varies in accordance with a probability distribution centered around the original output.

17. The system of claim 15, wherein the non-zero re-weighting factors are generated based on a ratio between a predicted probability distribution of the perturbed output of the component if the component was utilizing the counterfactual model comprising the counterfactual parameters and the probability distribution of the perturbed output of the component.

18. The system of claim 15, wherein the one or more computing devices perform further steps comprising: generating, if the one or more obtained counterfactual parameters are substantially different from corresponding parameters utilized during the collecting the data, a vector indicating a magnitude and a direction of change of the performance of the system for an incremental change in the model; and wherein further the re-weighting the collected data and generating the estimate are only performed if the one or more obtained counterfactual parameters are not substantially different from the corresponding parameters utilized during the collecting the data.

19. The system of claim 15, wherein the system is an advertisement presentation system; the component is an advertisement quality score determination component; the perturbed output is an advertisement quality score provided to an advertisement ranking component for generating a ranking of advertisements from which advertisements to be presented are selected; and the performance of the system is based on a compensation received for users selecting advertisements presented by the advertisement presentation system.

20. The system of claim 19, wherein the advertisement presentation system comprises a search engine; and wherein further the one or more inputs of the advertisement quality score determination component comprise an advertisement content of the advertisement for which a quality score is being generated and a search query, the selected advertisements being presented with search results that are responsive to the search query.

* * * * *